United States Patent Office 3,758,282
Patented Sept. 11, 1973

3,758,282
FUEL COMPOSITIONS
Keith Owen, Brightwell-cum-Sotwell, near Wallingford, and Geoffrey A. H. Roberts, Oxford, England, assignors to Esso Research and Engineering Company
No Drawing. Filed Dec. 17, 1969, Ser. No. 886,006
Claims priority, application Great Britain, Dec. 24, 1968, 61,250/68; Aug. 15, 1969, 40,977/69
Int. Cl. C10l 1/20
U.S. Cl. 44—69      22 Claims

ABSTRACT OF THE DISCLOSURE

Fuel compositions for spark ignition engines which comprise organo-metal anti-knock additives comprise, in addition, an ester of a selected type to mitigate the formation of deposits in the combustion chamber of the engine. Specific examples of suitable esters are benzyl salicylate, aryl phthalates, phenylacetates, benzyl halogenated aliphatic carboxylates and benzyl nitro- or halo-benzoates.

---

The present invention relates to hydrocarbon fuel compositions.

During the operation of internal combustion engines of the type having one or more pistons which reciprocate in respective cylinders and which employ an electric spark to ignite a charge of air and a fuel comprising hydrocarbons, it is found that the power output for a given intake of fuel (hereinafter termed the "efficiency") tends to fall off gradually.

This deterioration in performance is due in part to the deposition of solid material on the walls of the combustion chamber(s), spark plug(s) and valves (if any) of the engine: both the amount and type of the solid deposits may be significant in this respect.

During conditions of low loading of the engine, the temperature of the combustion chamber walls and the combustion charge pressure variations are relatively low and provide conditions under which any solid material formed during the combustion of the charge can be deposited. The solid deposits modify the combustion of the charge either by causing pre-ignition due, apparently, to incandescent particles on the chamber walls or possibly due to a catalytic effect, and there may be an additional effect termed "misfiring" caused by short-circuiting of the ignition spark by deposits between the electrodes of the spark-plug.

Under conditions of high loading of the engigne, some of the deposits (particularly carbonaceous deposits) tend to be removed from the combustion chamber walls under the influence of the high temperature thereof due to oxidation and/or breaking off, thus tending to improve the engine efficiency: other deposits, however, merely melt, and the molten deposits can cause short-circuiting between the electrodes of the spark plugs, resulting in a fall in efficiency.

Most hydrocarbon fuels for use in spark ignited engines incorporate a minor proportion of an organo-metallic compound to inhibit the phenomenon well-known in the art as "knocking." The organo-metallic compound anti-knock agent is usually a lead alkyl, such as lead tetra-ethyl, lead tetra-methyl or lead diethyl dimethyl. It has been recognised that the combustion of fuels containing such anti-knock compounds leads to the deposition of lead-containing material in the combustion chamber and on the spark plugs: to mitigate such deposition, the fuels generally incorporate a halogen-containing organic additive, known as a scavenger, for removing the lead-containing deposits by converting the relatively involatile lead oxides to the more volatile lead halides. However, such additives have a number of disadvantages, such as corrosivity, when used above certain concentrations, and some deposition of lead compounds and the consequential fall in engine efficiency is generally unavoidable.

This reduction in engine efficiency, although fundamentally attributable to misfiring, may not always be noticed as such by the operator of a misfiring engine: for instance, the misfiring may be intermittent, or the electrodes of the spark plug(s) may not be completely short circuited so that a weak spark is produced which causes ignition of the combustion charge, but not full combustion of the charge.

The more obvious signs to the engine operator of reduced engine efficiency from this cause are increased fuel consumption, lower maximum engine speeds when the engine is hot, and an increase in the quantity of uncombusted or partially combusted hydrocarbon in the exhaust emission. The amount of hydrocarbon or partially combusted hydrocarbon in the exhaust emission is of increasing concern in many countries, since such products are known to be contributary to air pollution which can be hazardous to health; for example, the smog which has invaded the Los Angeles area of California, U.S.A. from time to time is considered to be attributable, at least in part, to the action of the strong sunlight of that area on hydrocarbons in the atmosphere from the exhaust gases of automobiles and other vehicles powered by internal combustion engines.

The present invention is based on the discovery that the fall-off in efficiency of engines of the specified type is mitigated by including in the combustion charge certain chemical compounds as will hereinafter be described.

The manner in which these hereinafter described chemical compounds tend to maintain the efficiency of the engine is not fully understood, but it has been observed that they modify any deposits in the engine and tend to inhibit the formation of relatively thick and troublesome deposits on the combustion chamber walls, valves and spark plugs. Where the fuel contains a lead-alkyl anti-knock compound, any lead-containing deposits tend to be relatively friable compared to lead-containing deposits normally formed, and it may be that such deposits adhere less readily to the aforesaid parts of the engine than previously known lead-containing deposits.

The compounds for use according to the present invention are esters which are soluble in gasoline (with or without the aid of a solubilizing agent) at least to the extent required for them to be effective in mitigating the fall-off in engine efficiency, and have the following general formula:

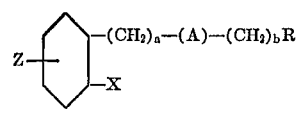

(Formula I)

wherein X can be H, OH or $ACH_2R'$; A represents the residue of a carboxyl group, that is to say, either

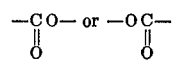

R and R' can each represent a halogen or a halogenated $C_1$ or $C_2$ alkyl group, an alkyl group having at least two and preferably at least three carbon atoms with a maximum of about twelve carbon atoms, or a phenyl group which is either unsubstituted or substituted with one or two amino halogen or nitro-substituents or a methyl or dimethyl derivative of the substituted or unsubstituted phenyl group; Z represents from zero to the maximum possible number of substituent alkyl groups, particularly methyl and ethyl groups, and $a$ and $b$ each can have values of zero or unity, provided that $a$ is not zero when $b$ is zero, and provided that (i) when $a=1$ and $b=1$, R is either a straight or branched-chain alkyl group having at least 2 and preferably at least having 3 carbon atoms with a maximum of about 12 carbon atoms, or a phenyl group or a mono- or dimethylphenyl group, and X is hydrogen, (ii) when $a=0$ and $b=1$, R is either phenyl or mono- or dimethyl phenyl and X is either OH (or (A)—$CH_2R'$, and (iii) when $a=1$ and $b=0$, R is a halogen, a halogenated $C_1$ or $C_2$ alkyl group, or a phenyl or methylphenyl or dimethylphenyl group having at least one amino, halogen or nitro-substituent in the ortho- and/or para-position.

Thus esters according to Formula I given above which fall within the terms set by proviso (i) may have the general Formula II.

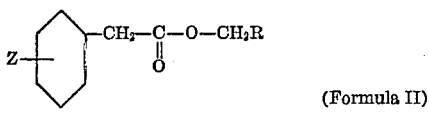

(Formula II)

wherein R is a straight or branched-chain alkyl group having at least 2 and preferably at least 3 carbon atoms up to a maximum of about 12 carbon atoms, or a monocyclic aryl group, such as phenyl, toluyl or dimethylphenyl.

Compounds meeting the terms of proviso (ii) of the Formula I may have the following general Formulae III or IV.

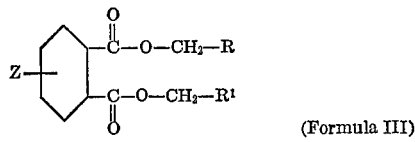

(Formula III)

where $R^1$ and R can be the same or different and alkyl or monocyclic aryl (such as phenyl, toluyl or dimethylphenyl). Thus when R is aryl, $R^1$ is aryl or a branched or straight chain alkyl group having at least 2 and preferably at least 3 carbon atoms up to a maximum of about 12 carbon atoms, and when $R^1$ and R are both alkyl groups, each may be a straight or a branched chain alkyl group having at least 2 and preferably at least 3 carbon atoms up to a maximum of about 12 carbon atoms.

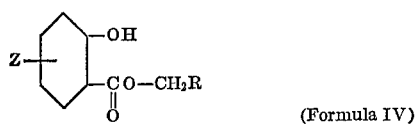

(Formula IV)

where R is a monocyclic aromatic group, such as phenyl, monomethylphenyl or dimethylphenyl.

Compounds falling within the terms of proviso (iii) of the Formula I may have the general Formula V:

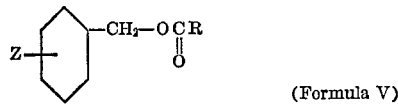

(Formula V)

where R has any of the forms mentioned above in proviso (iii).

All of the esters are employed in minor proportions in the fuel compositions of the invention, and a suitable range of concentrations of the afore-defined compounds is from 0.01–1.0 gram per 100 millilitres of gasoline: in most instances, a preferred range of concentrations will be from 0.015 to 0.15 gram/100 mls., a narrower range may be 0.02 to 0.1 gram/100 mls., and for most esters, an economic and useful concentration will be about 0.05 gram/100 mls. gasoline.

A number of gasoline compositions embodying exemplary chemical compounds falling within the various formulae given above were subjected to comparative tests, employing the following procedure:

A Ford Cortina spark-ignited automobile engine of 1500 cc. cubic capacity mounted on a test bed provided with a brake was operated alternately under low load conditions in order to promote the formation of cylinder deposits and then under high load conditions.

The low load conditions consisted of 10 cycles of 1 hour's duration, composed as follows:

2½ minutes at 800 r.p.m.
10 minutes at 1200 r.p.m.
2½ minutes at 800 r.p.m.
25 minutes at 1200 r.p.m.
10 minutes at 1000 r.p.m.
10 minutes at 1750 r.p.m.

After the 10 cycles, the engine was shut down for two hours, and a further 10 cycles performed, followed by a further shut-down of two hours. This sequence of cycles was devised to promote a maximum of deposition of solid material in the cylinders of the engine.

The 24 hours of low load operation was followed by two minutes of high load operation, the engine speed reaching 3600 r.p.m. under full throttle. Each sequence of alternating low load and then high load conditions was carried out several times.

The original brake power $P_1$ of the engine was determined before the tests, the power $P_2$ before the high load operation and the power $P_3$ after the high load operation. The difference $P_3-P_2$ is a measure of the improvement in efficiency mainly arising from the removal of carbonaceous deposits during the high load period of operation, and the difference $P_1-P_3$ is a measure of the inefficiency of the engine caused mainly by fusible deposits, particularly lead compounds, which fully or partially short-circuit the electrodes of the spark plugs.

It was found that $P_3$ diminished as the test proceeded.

The results were expressed as the percentage power loss after testing, relative to the original power—i.e. $(P_1-P_3) \times 100/P_1$. Generally speaking, the percentage power loss in the tests greatly exceeded the power loss which is encountered in the ordinary operation of automobile engines due to the test procedure employed.

Three different gasolines containing various amounts of tetraethyl lead per U.S. gallon were employed in the tests, the tests being performed first without any other additives in the gasoline to provide a control result and then with an addition of a chemical compound in accordance with the aforementioned general formulae.

The test results are summarized in the following examples.

EXAMPLE 1

The base gasoline A contained 2.47 mls. tetraethyl-lead (TEL)/U.S. gallon, and had a Research Octane number of 96.1 and a Motor Octane number of 85.8.

The lubrication of the engine was effected by a commercially available permium multigrade detergent lubricant X.

The test programme described above was performed twice for a total of 70 hours, once-using the gasoline A alone and then using a gasoline composition in accordance with the invention formed by adding to gasoline A, 0.05 gram of benzyl salicylate/100 mls. of A.

Benzyl salicylate is an example of a compound in accordance with Formula IV.

The results of the test were as follows:

| Fuel: | Percent power loss |
|---|---|
| Gasoline A | 15 |
| Gasoline A+benzyl salicylate | 10.5 |

EXAMPLE 2

The test procedure was performed with the same Gasoline A as employed in Example 1, and then with a composition in accordance with the invention comprising gasoline A+0.5 gram iso-butyl phenylacetate/100 mls. of A.

Iso-butyl phenylacetate is an example of a compound in accordance with Formula II. Lubrication was again effected with the premium multigrade detergent lubricant X.

The tests were performed for a total of 166 hours with each fuel, and the results were as follows:

| Fuel: | Percent power loss |
|---|---|
| Gasoline A | 45 |
| Gasoline A+iso-butyl phenylacetate | 26 |

EXAMPLE 3

The test procedure was performed using a commercially-available multigrade detergent Y (SAE 10W30) and with a base gasoline B containing 3.6 mls. TEL/U.S. gallon. The Research Octane number of gasoline B was 101.9 and the Motor Octane number was 90.4.

The additive employed to form a composition in accordance with the invention was di-n-butyl phthalate, in accordance with Formula III, in a concentration of 0.05 gram/100 mls. of gasoline B.

The tests on the gasoline B, and then on the composition of the invention were each performed from 166 hours, yielding the following results:

| Fuel: | Percent power loss |
|---|---|
| Gasoline B | 61.5 |
| Gasoline B+di-n-butyl phthalate | 31 |

EXAMPLE 4

In this test, the aforementioned premium multigrade lubricant X was employed, and the base gasoline was gasoline A as in Examples 1 and 2.

The additive chemical compound was dibenzyl phthalate in a concentration in gasoline A of 0.05 gram/100 mls. of gasoline A.

After a total test time of 166 hours, the following results were obtained:

Power loss with gasoline A equals 45%, power loss with gasoline A+dibenzyl phthalate equals 20%.

EXAMPLE 5

Base gasoline C containing 2.47 mls. TEL/U.S. gallon, and having a Research Octane number of 101.3 and Motor Octane number of 89.6, after testing 166 hours using Lubricant X gave the following results:

| Fuel: | Percent power loss |
|---|---|
| Gasoline C | 25 |
| Gasoline C+n-butyl benzyl phthalate | 11 |

EXAMPLES 6–11

The test procedure previously described was performed for various additive compounds as defined by Formula I, or by any one of the Formulae II, III, IV or V. The additive compounds were each in a concentration of 0.05 gram/100 mls. of gasoline, the selected gasoline being the gasoline C of Example 5, and the lubricant being the commercially available premium multigrade detergent lubricant X. The total test time for each fuel composition was 166 hours.

The results of each of the tests are given in Table I below: the column headed "formula" refers to the three general Formulae II, III, IV and V given hereinabove.

TABLE I

| Example number | Additive compound | Formula | Percent power loss |
|---|---|---|---|
| 6 (control) | | | 25 |
| 7 | Benzyl phenylacetate | II | 13.5 |
| 8 | Benzyl n-butyl phthalate | III | 11.0 |
| 9 | n-Butyl phenylacetate | II | 15.5 |
| 10 | Benzyl chloroformate | V | 12.5 |
| 11 | Benzyl trichloracetate | V | 13.0 |

The results of experiments 7–11 demonstrate that the additive compounds according to the general Formula I, and according to respective ones of the Formulae II–V, provide dramatic improvements in the loss of power occasioned by the use of the base gasoline C alone as in Example 6.

EXAMPLE 12

The test procedure described above was performed, employing the base gasoline B and the lubricant Y of Example 3. After 166 hours of testing using the gasoline B alone, and then 166 hours of testing using a fuel composition of gasoline B+0.05 gram of benzyl para-nitrobenzoate/100 grams of gasoline B, the following results were obtained.

| Fuel: | Percent power loss |
|---|---|
| Gasoline B | 61.5 |
| Gasoline B+benzyl p-nitrobenzoate | 36.5 |

It will be apparent that benzyl para-nitrobenzoate, which falls within the terms of Formula V, provides a very marked benefit in reducing power loss.

The additive compounds tested above do not, of course, represent an exhaustive list of compounds which can be used, to reduce potential power losses. Among other compounds, including some relatively well-known compounds, which can be employed for this purpose are the following:

In accordance with the class of compounds defined by Formula II: the iso- or n- amyl, hexyl, heptyl, octyl, nonyl, decyl, undecyl and dodecyl esters of phenylacetic acid or its methylated or ethylated φ-homologues.

In accordance with the class of compounds defined by Formula III:
(a) among the diaryl phthalates, are the di- or mixed monomethylbenzyl and dimethylbenzyl esters of phthalic acid, or methylphthalic or ethylphthalic acid.
(b) among the mixed alkyl aryl phthalates, any combination of the aryl groups of (a) above with n- or iso- ethyl, propyl, pentyl, hexyl, heptyl, octyl, nonyl, decyl, undecyl and dodecyl alkyl groups.

In accordance with the class of compounds defined by Formula IV: the benzyl, methylbenzyl and dimethylbenzyl esters of salicylic acid, or any of the cresotic acids.

In accordance with the class of compounds defined by Formula V: (a) the benzyl, methylbenzyl and dimethylbenzyl esters of para- and otho-nitrobenzoic acid and 2,4-dinitrobenzoic acid.

Preferred among these esters are benzyl orthonitrobenzoate and benzyl 2,4-dinitrobenzoate.

EXAMPLES 13–19

Tests were also carried out on a number of compounds, some of which have previously been proposed as additives for gasolines to mitigate power loss of the compounds, none of which was in accordance with Formulae I–V. The tests were each carried out over periods of 166 hours, employing gasoline C and the premium detergent lubricant X.

All of the compounds tested were in concentrations of 0.05 gram/100 mls. gasoline.

The results of the tests on these compounds are given in Table II.

TABLE II

| Example number: | Additive compound | Percent power loss |
|---|---|---|
| 13 (control) | | 25.0 |
| 14 | Benzyl acetate | 25.0 |
| 15 | Phenyl benzoate | 47.5 |
| 16 | Benzyl benzoate | 25.0 |
| 17 | tert-Butyl phenyl carbonate | 40.0 |
| 18 | tert-Butyl benzoate | 20.5 |
| 19 | tert-Butyl acetate | 28.0 |

The results of Examples 14 to 19 show that compounds which differ only in apparently minor respects as regards chemical make-up either improve the percentage power loss marginally in comparison to the power loss of the base gasoline, or do not detectably change the percentage power loss, or in some cases, worsen the power loss to a very substantial degree.

This is in contrast with the ester additive compounds used in the fuel compositions of the invention, where the improvement in power loss is very appreciable; in many of the examples where the ester additive compounds of the invention are used, the percentage power loss is less than half the percentage power loss occasioned with the base gasoline alone.

It will be seen from the above examples, that compounds falling within the definitions of Formulae I, II, III, IV and V provide considerable benefits in mitigating power loss in the test engine.

In addition to the aforementioned benefits, it was observed that unlike the phosphorus-containing additives previously employed to mitigate the fall in power output or efficiency of the engine, there was no octane debit (that is to say, the octane number of the fuel composition of the invention did not deteriorate relative to the base gasoline).

What is claimed is:

1. A fuel composition for a spark-ignition engine comprising a major proportion of a hydrocarbon fuel containing an organo lead anti-knock additive, said hydrocarbon fuel boiling in the gasoline range, and an engine efficiency maintaining amount of an ester having the general formula:

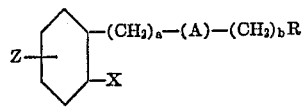

wherein X is selected from the group consisting of H, OH and ($ACH_2R^1$); A represents

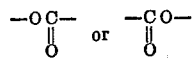

R and $R^1$ are each selected from the group consisting of halogens, halogenated $C_1$ to $C_2$ alkyl groups, alkyl groups having from 2 to 12 carbon atoms, phenyl, alkylphenyl, amino phenyl, amino alkylphenyl, nitrophenyl, and nitroalkylphenyl; Z represents from zero to the maximum possible number of substituent alkyl groups, and $a$ and $b$ have values selected from zero and unity, provided that $a$ is not zero, when $b$ is zero, and further provided that:

(i) when $a=0$ and $b=1$, R is phenyl or alkylphenyl, and X is OH or ($ACH_2R^1$),
(ii) when $a=1$ and $b=1$, X is hydrogen and R is alkyl, phenyl or alkylphenyl, and
(iii) when $a=1$ and $b=0$, X is hydrogen and R is a halogen, a halogenated $C_1$- to $C_2$-alkyl group, a phenyl group or an alkyl-phenyl group, the two latter groups having at least one amino or nitro substituent in an ortho or para position.

2. A composition according to claim 1 in which the ester has the general formula:

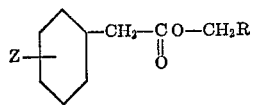

wherein R represents groups selected from straight and branched chain $C_2$ to $C_{12}$ alkyl, phenyl, methylphenyl and dimethylphenyl.

3. A composition according to claim 2 in which the ester is chosen from one of the following: benzyl, methylbenzyl and dimethylbenzyl phenylacetates, n-butyl and isobutyl phenylacetates and normal and iso $C_5$–$C_{12}$ alkyl phenylacetates.

4. A composition according to claim 2 in which the concentration of the ester is 0.01 to 1.0 gram per 100 millilitres.

5. A composition according to claim 2 in which the concentration of the ester is 0.015 to 0.15 gram per 100 millilitres.

6. A composition according to claim 2 in which the concentration of the ester is about 0.05 gram per 100 millilitres.

7. A composition according to claim 1 in which the ester has the general formula

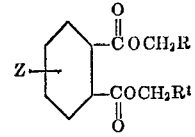

wherein R is selected from the group consisting of phenyl, methylphenyl, dimethylphenyl and $R^1$ is selected from the group consisting of straight and branched chain $C_2$ to $C_{12}$ alkyl groups, phenyl, methylphenyl and dimethylphenyl.

8. A composition according to claim 7 in which the ester is one of the following: benzyl butyl phthalate, methylbenzyl ($C_2$–$C_{12}$) alkyl phthalate, and dimethylbenzyl ($C_2$–$C_{12}$) alkyl phthalate.

9. A composition according to claim 7 in which the concentration of the ester is 0.01 to 1.0 gram per 100 millilitres.

10. A composition according to claim 7 in which the concentration of the ester is 0.015 to 0.15 gram per 100 millilitres.

11. A composition according to claim 7 in which the concentration of the ester is about 0.05 gram per 100 millilitres.

12. A composition according to claim 1 in which the ester has the general formula

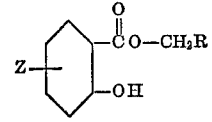

where R is selected from the group consisting of phenyl, methylphenyl and dimethylphenyl.

13. A composition according to claim 12 in which the ester is benzyl salicylate.

14. A composition according to claim 12 in which the concentration of the ester is 0.01 to 1.0 gram per 100 millilitres.

15. A composition according to claim 12 in which the concentration of the ester is 0.015 to 0.15 gram per 100 millilitres.

16. A composition according to claim 12 in which the concentration of the ester is about 0.05 gram per 100 millilitres.

17. A composition according to claim 1 in which the ester has the general formula

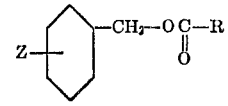

wherein R is selected from a halogen, a halogenated $C_1$ to $C_2$ alkyl group, and phenyl and alkylphenyl having at least one substituent in a position chosen from the ortho- and para-positions, the substituent being chosen from amino and nitro groups.

18. A composition according to claim 17 in which the ester is selected from the group consisting of benzyl chloroformate, benzyl trichloroacetate, benzyl ortho-nitrobenzoate, benzyl para-nitrobenzoate, and benzyl 2,4-dinitrobenzoate.

19. A composition according to claim 17 in which the concentration of the ester is 0.01 to 1.0 gram per 100 millilitres.

20. A composition according to claim 17 in which the concentration of the ester is 0.015 to 0.15 gram per 100 millilitres.

21. A composition according to claim 17 in which the concentration of the ester is 0.02 to 0.1 gram per 100 millilitres.

22. A composition according to claim 17 in which the concentration of the ester is about 0.05 gram per 100 millilitres.

References Cited
UNITED STATES PATENTS

| | | | |
|---|---|---|---|
| 1,995,615 | 3/1935 | Jaeger | 44—70 |
| 3,083,088 | 3/1926 | Carlson et al. | 44—70 |
| 2,937,933 | 5/1960 | Heisler et al. | 44—70 |
| 2,465,209 | 3/1949 | De Verter | 44—70 |
| 3,232,724 | 2/1966 | Finnigan et al. | 44—69 |
| 2,284,080 | 5/1942 | Backoff et al. | 44—58 |
| 2,214,768 | 9/1940 | Lincoln | 44—79 |
| 2,281,598 | 5/1942 | Prutton | 44—79 |
| 3,563,715 | 2/1971 | Richardson et al. | 44—66 |

DANIEL E. WYMAN, Primary Examiner

Y. H. SMITH, Assistant Examiner

U.S. Cl. X.R.

44—58, 70